United States Patent
Kim et al.

(10) Patent No.: US 8,319,187 B2
(45) Date of Patent: Nov. 27, 2012

(54) SYSTEM AND METHOD COUNTING PHOTONS

(75) Inventors: Sung-su Kim, Yongin-si (KR); Dong-goo Kang, Suwon-si (KR); Young-hun Sung, Hwaseong-si (KR); Jong-ha Lee, Hwaseong-si (KR); Seok-min Han, Seongnam-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 120 days.

(21) Appl. No.: 12/805,759

(22) Filed: Aug. 18, 2010

(65) Prior Publication Data

US 2011/0042573 A1    Feb. 24, 2011

(30) Foreign Application Priority Data

Aug. 19, 2009  (KR) .......... 10-2009-0076514

(51) Int. Cl.
*G01T 1/24* (2006.01)
(52) U.S. Cl. .................. 250/370.01
(58) Field of Classification Search ............ 250/370.01–370.15, 362, 363.01–363.1; 378/98.8
See application file for complete search history.

(56) References Cited

U.S. PATENT DOCUMENTS

| | | | |
|---|---|---|---|
| 4,612,443 A | 9/1986 | Alcidi | |
| 5,132,540 A | 7/1992 | Adolph et al. | |
| 2003/0228703 A1* | 12/2003 | Hoppe et al. | 436/172 |
| 2006/0015290 A1 | 1/2006 | Warburton et al. | |
| 2008/0033673 A1* | 2/2008 | Anton et al. | 702/70 |
| 2008/0172206 A1 | 7/2008 | Mott | |

FOREIGN PATENT DOCUMENTS

JP    2008-501954    1/2008

OTHER PUBLICATIONS

Perenzoni et al., "A multispectral analog photon-counting readout circuit for x-ray hybrid pixel detectors," 2008, IEEE Transactions on Instrumentation and Measurement, vol. 57, No. 7, pp. 1438-1444.*
"Photon Counting: Using Photomultiplier Tubes," Hamamatsu Photonics K.K. Electron Tube Division, Printed in Japan, Jul. 2005 pp. 1-29.
"Photomultiplier Handbook," Burle Industries, Inc. Printed in U.S. A., 1980, pp. 2-180.

* cited by examiner

*Primary Examiner* — Kiho Kim
(74) *Attorney, Agent, or Firm* — Staas & Halsey LLP

(57) ABSTRACT

Disclosed are a system and method counting photons. Photons are counted through a plurality of counters. Each of the counters generates a flag signal indicating the availability of each counter for an output of a photon detector. The generated flag signal is input into a control unit which controls a switching unit. The control unit allows a signal to be input into a counter, which is not in dead time, based on the received flag signal.

29 Claims, 6 Drawing Sheets

SYSTEM AND METHOD COUNTING PHOTONS

CROSS-REFERENCE TO RELATED APPLICATIONS

This application claims the benefit under 35 U.S.C. §119(a) of Korean Patent Application No. 10-2009-0076514, filed on Aug. 19, 2009, the disclosure of which is incorporated by reference in its entirety for all purposes.

BACKGROUND

1. Field

One or more embodiments relates to a photon counting system and method.

2. Description of the Related Art

In general, a photon counting detector is a detector capable of counting a single photon of incident light. For example, the photon counting detector may include a photomultiplier, which typically has a photocathode and an electron multiplier, composed of several dynodes, and an anode. As photons of light enter the photocathode, photoelectrons are emitted by the photocathode toward the electron multiplier, for a secondary electron emission, and then collected by the anode. Accordingly, charges are generated at the anode in the form of current pulses, with each pulse generally representing a single photon count, i.e., if a photon was collected by the photocathode and then multiplied by the electron multiplier then a corresponding pulse of an expected height and width should be observed at the anode. By reviewing the charge at the anode, as each expected pulse is detected the total photon count can be incremented. Accordingly, a photon counting detector is configured to detect photons of incident light and output pulse signals corresponding to the detected photons. Typically, the number of pulse signals corresponds to the number of photons.

As shown in FIG. 6A, to count the photons, the output pulse signals need to be subject to signal processing, such as a current to voltage converter to convert the current pulse signals at the anode into voltage signals, an amplifier to amplify the voltage signals, and a discriminator to discriminate between pulse heights that are too low, thereby representing a non-photon event from some noise, or pulse heights that are too high, potentially representing other inaccuracies. Finally, after the discriminator there may be a pulse shaper to reshape the output signal of the discriminator, as the output of the discriminator may be a constant level, such as a TTL logic level of CMOS level. Thus, the pulse shaper may form a rectangular pulse that is more preferable to the counter for counting the discriminated pulses. The counter may then count the number of pulses, represented by the rectangular pulse that are passed through the discriminator.

However, for such signal processing there is an accompanying dead time, i.e., a period of time when the system is currently processing an operation, such as another counting of a photon from a previous pulse signal, and can therefore not immediately commence with processing another predetermined instruction, such as a processing of a most recent pulse signal that is output from the photomultiplier during this dead time, without inaccuracies being generated in the counting of photons.

Thus, when considering the dead time in a system, if a second pulse signal is output by the photomultiplier, for example, indicating the detecting of a second photon by the photomultiplier while a first pulse signal corresponding to a first photon is being still being processed, a "pile-up" where the first and second pulse signals overlap each other occurs. FIG. 6B illustrates such a pile-up situation, where the charges pile up through the addition of several pulses output by the photomultiplier Such a pile-up prevents an accurate counting of photons. Conventionally this problem has been alleviated by attenuating or eliminating the second pulse signal by use of a rejector, i.e., the second pulse to be applied to the signal processing is rejected if received during the dead time. However, when this solution is employed, photons that are detected by a photomultiplier, for example, during the dead time are not counted by the adjoining signal processing elements, they are rejected or eliminated. This can be seen in FIG. 6C, where until the charge from the first pulse has adequate time to dissipate additional charges from subsequent pulses are not added, resulting in the photon counts from those subsequent pulses being lost. Therefore, this solution of rejecting potentially properly detected photons, while alleviating the pile up problem, is not suitable for application in photon counting, as the total number of counted photons will be inaccurate.

SUMMARY

According to an aspect of one or more embodiments, there may be provided a photon counting system, the system including a counting unit including a plurality of counters configured to respectively count photons detected by a sensor unit, a switching unit to selectively electrically provide an electric signal from the sensor unit, representing a potential detection of a photon by the sensor unit, to at least one of the counters, and a control unit to control the switching unit to selectively electrically provide the electrical signal to the at least one counter based on one or more received flag signals indicating whether one or more of the plurality of counters are in respective dead times that could result in respective pile ups of plural charges for plural photon detections at the respective one or more plurality of counters that are in dead time, with the control unit selectively providing the electric signal to the at least one counter that is not in the dead time.

According to an aspect of one or more embodiments, there may be provided a photon counting system, the system including a counting unit including a plurality of counters configured to respectively count photons detected by a sensor unit, a switching unit to selectively electrically provide an electric signal from the sensor unit, representing a potential detection of a photon by the sensor unit, to at least one of the counters, and wherein the switching unit selectively electrically provides the electrical signal to the at least one counter based on one or more status indicators from the counting unit indicating whether one or more of the plurality of counters are in respective dead times that could result in respective pile ups of plural charges for plural photon detections at the respective one or more plurality of counters that are in dead time, with the switching unit selectively providing the electric signal to the at least one counter that is not in the dead time.

According to an aspect of one or more embodiments, there may be provided a photon counting method, the method including selecting at least one of a plurality of counters, configured to respectively count photons detected by a sensor unit, that is not in a dead time based on at least one status indicator indicating a counting availability of the counters, and selectively providing an electric signal from the sensor unit, representing a potential detection of a photon by the sensor unit, to the selected at least one counter, wherein the selecting of the at least one counter is based on the at least one status indicator indicating whether one or more of the plurality of counters are in respective dead times that could result in respective pile ups of plural charges for plural photon detections at the respective one or more plurality of counters that are in dead time, with the selective provision of the electric signal including selectively providing the electric signal to the selected at least one counter that is not in the dead time.

Other features will become apparent to those skilled in the art from the following detailed description, which, taken in conjunction with the attached drawings, discloses one or more embodiments of the invention.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
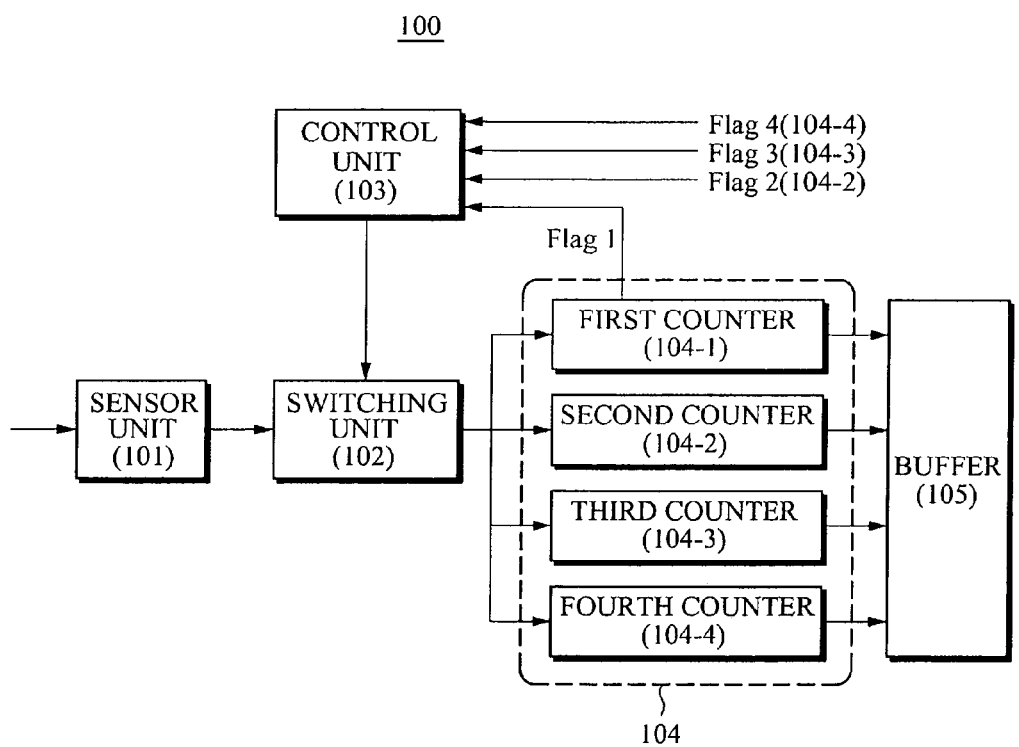
FIG. 1 illustrates a photon detection and counting system, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a view illustrating a photon detecting and counting system, according to one or more embodiments.

As shown in FIG. 1, the photon detecting and counting system 100 may include a sensor unit 101, a switching unit 102, a control unit 103, a counting unit 104, and a buffer 105, for example.

The sensor unit 101 receives optical signals and outputs electric signals corresponding to the received optical signals. For example, the sensor unit 101 detects photons and generates respective pulse currents corresponding to the detected photons. Such a sensor unit 101 may be implemented using a photo diode that generates current in response to light, for example. The sensor unit 101 may equally be a CCD or a photomultiplier, and the incident light could include light of different wavelengths, including X-ray photons, as only an example. Additionally, the sensor unit may include plural photon detectors, such as respectively detecting photons for different sensors.

The switching unit 102 selectively provides the electric signals or charges output from the sensor unit 101 to the appropriate counter within the counting unit 104. The counting unit 104 may include a first counter 104-1, a second counter 104-2, a third counter 104-3, and a fourth counter 104-4, for example. The switching unit 102 selectively provides the electric signal or charge from the sensor unit 101 to any one of the counters 104-1, 104-2, 104-3 and 104-4 that is not in a dead time, e.g., according to one or more control signals of the control unit 103.

Figure 6A:
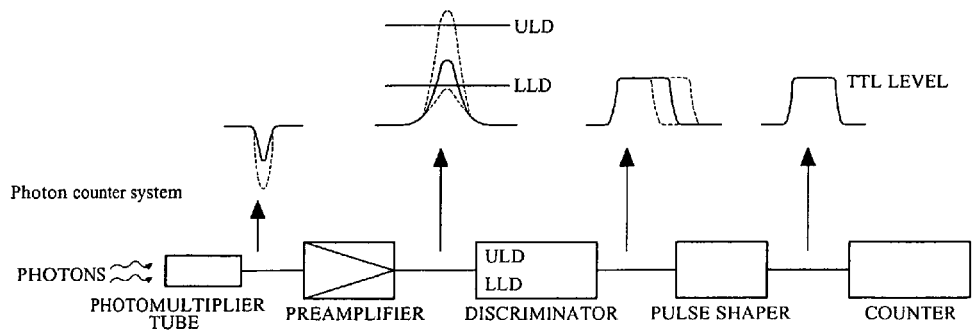
FIGS. 6A-6C illustrate a photon detector arrangement and resultant pile-up of charges caused by the dead time of signal processing.
Figure 6B:
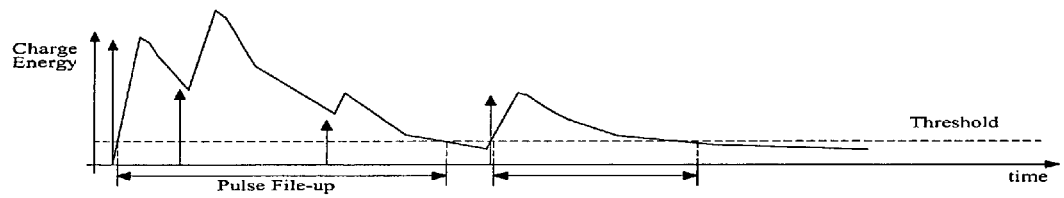
Figure 6C:
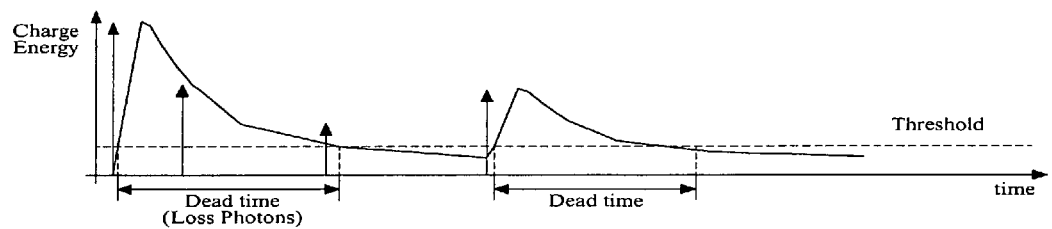

As demonstrated in FIGS. 6B and 6C, dead time is a period of time during which the photon detection system is in operation with a counting of a photon for a previously provided pulse signal, such that a pile up may occur if the photon detection system were to begin to process subsequent photon pulse signals unless the original counting has been completed or at least the subsequent pulse signal will not overlap with the previous pulse signal.

According to one or more embodiments, the switching unit 102 prevents the electric signal or charge from being provided to a counter currently in operation and provides the electric signal or charge to another counter, e.g., a counter that is in a standby status. One or more mechanisms for providing electric signals or charges from the sensor unit 101 to the counter not in dead time will be described in greater detail below.

The counters 104-1, 104-2, 104-3 and 104-4 of the counting unit 104 are configured to count photons, for example.

Figure 2:
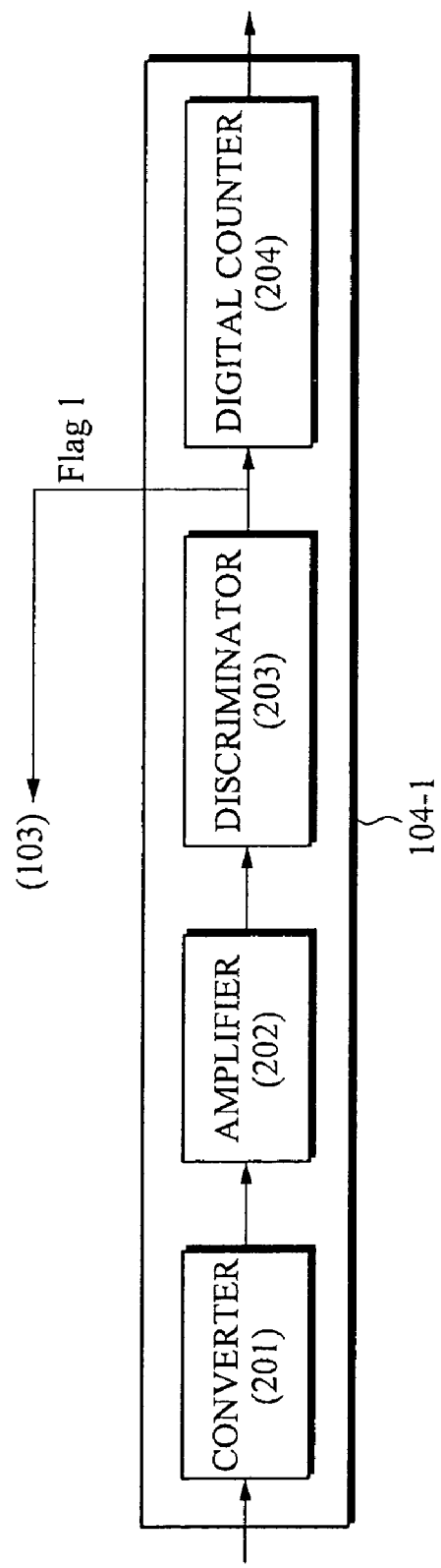
FIG. 2 illustrates a counter of a counting unit, according to one or more embodiments.

FIG. 2 is a view illustrating a counter, such as a counter of counting unit 104, according to one or more embodiments. For example, the first counter 104-1 may include a converter 201, an amplifier 202, a discriminator 203, and a digital counter 204, for example, and each of the converter 201, amplifier 202, discriminator 203, and digital counter 204 may be configured to operate on an expected input voltage or current to count photons.

Depending on the photon detector and the signal processing, the converter 201 converts received electric signals or charges into voltages or current. For example, if the sensor unit 101 generates an electric current or charge represented by a pulse signal, the converter 201 may convert the received electric current into a voltage. If the remainder of the signal processing does not need such a conversion, then the converter can be excluded from the counter.

As needed, the amplifier 202 may amplify the outputs of the converter 201. If the provided electric signal or charge from the sensor unit 101 is of a sufficient detectable level then the amplifier may not be needed. However, when detecting photons through a photomultiplier, for example, the generated pulse signals at the anode of the photomultiplier may typically still need amplification for adequate and accurate discrimination and counting.

The discriminator 203 may serve to review the amplified pulse signal for a lower threshold, e.g., with pulse signals that are greater than this threshold being identified as representing photons. The discriminator 203 may also discriminate the amplified pulse signal for an upper threshold for potentially discriminating out pulse signals that are too high. The output of the discriminator 203 may merely be a constant "HIGH" or "LOW" signal, e.g., representing whether the amplified pulse signal fell between the lower and upper thresholds, or at least whether the amplified pulse was above the lower threshold. For example, the discriminator 203 compares a received amplified voltage or current with a predetermined reference voltage or predetermined current, as the thresholds, such that a digital comparative value is output. The output of the discriminator 203 may be a constant TTL logic level or CMOS level, for example, though alternative output levels are available, and the output of the discriminator 203 may alternatively be a rectangular pulse, for example, adequate for the subsequent digital counter 204 to count. The discriminator 203 or other reviewing stages of the counter 104, for example, may provide the buffer 105 with additional information regarding each pulse signal that has been discerned to be a photon count, such as pulse amplitude, pulse width, dissipation time, frequency, etc., as only examples, that may be analyzed for additional information regarding the detected photons.

Thus, the sensor unit 101 may detect a photon and generate a pulse current in response to the detected photon. The pulse current may be converted into a pulse voltage through the converter 201. After that, the converted pulse voltage may be amplified by the amplifier 202 and then input into the discriminator 203. As noted, the discriminator 203 may then compare the received amplified voltage with a predetermined reference voltage and output a constant binary 'HIGH' or 'LOW' signal based on the comparison result. For example, if a difference between the amplified voltage and the reference voltage exceeds at least the lower threshold value, the discriminator 203 outputs '1', and if a difference between the amplified voltage and the reference voltage is below the lower threshold value, the discriminator 203 outputs '0'. Thus, the output of the discriminator 203 may be the constant "HIGH" or "LOW" signals or digital output of "1" or "0", for example. In one or more embodiments, a pulse shaper may follow the discriminator 203, or be provided with the discriminator 203 or the digital counter 204, to generate a rectangular pulse, for example, that may be preferable for the counting by the digital counter 204.

The digital counter 204 may thus count the digital comparative value output from the discriminator 203, and increment the count every time a new binary "HIGH" signal from the discriminator 203 is detected. For example, in the above case, the digital counter 204 counts outputs of '1' generated by the discriminator 203. In one or more embodiments, upon completion of the count the discriminator 203 may change the corresponding digital comparative value back to a "LOW" level. Based upon this "LOW" level, the control unit 103 may discern that the corresponding counter 104 is available for a next pulse signal.

The output of the discriminator 203, that is, the digital comparative value of the discriminator 203 may control the application of a corresponding flag signal that is provided to the control unit 103. The flag signals represent the respective availability or operational state of the counters 104-1, 104-2, 104-3 and 104-4, and may be input into the control unit 103, or in one or more embodiments directly provided to the switching unit 102. The discriminator 203 may accordingly notify the control unit whenever a pulse signal has been reviewed, the counter 104 is ready for a new pulse signal, or merely indicate when no currently applied pulse signal meets the lower threshold. The flag may be provided to the control unit 103 to indicate that the counter 104-1, for example, is at a stage where a new electric signal or charge from the sensor unit 101 can be counted without causing a pile up. As another example, the flag can merely be the output of the discriminator 203, e.g., the constant "HIGH" or "LOW" signal. The control unit 103 may be configured to accept either of the constant "HIGH" or "LOW" signals or any other signal that would indicate the readiness for a new pulse signal of the respective counter 104.

Referring again to FIG. 1, based on whether the counters are available for another electric signal or charge from the sensor unit 101, the control unit 103 controls the switching unit 102 such that the electric signal or charge provided by the sensor unit 101 is selectively provided to one of the counters 104-1, 104-2, 104-3 and 104-4 that is not in dead time, e.g., based on the respective flag signals.

For example, when Flag 1 from counter 104-1 is '1', and Flag 2 from counter 104-2, Flag 3 from counter 104-3, and Flag 4 from counter 104-4 are all '0', the first counter 104-1 will be considered to be in an operational state, and the remaining 104-2, 104-3 and 104-4 will be considered to be in a standby state. In that case, when another electric signal or charge is provided by the sensor unit 101 the control unit 103 controls the switching unit 102 such that the output of the sensor unit 101 is electrically connected to one of the second counter 104-2, the third counter 104-3 and the fourth counter 104-4. For convenience sake, in the foregoing description, the flag signal and the digital comparative value have been described as being set as a value '1' or '0', but are not limited thereto. The flag signal and the digital comparative value may be set using other values. In addition, the flags are not required to be provided solely by the output of each discriminator 203 to each counter 104, but may be provided by other dead time determinative portions of each counter 104. Additional status information for each discriminator 203 may be available and provided to the control unit 103 and/or the buffer 105, for example, such as additional information for additional and/or alternative thresholds in amplitude and other characteristics of the discriminated pulse signal. Still further, the flag signals may not necessarily merely represent a same constant "HIGH" or "LOW" signal, for example, provided by each discriminator 203 to each digital counter 204, but may be caused to be pulsed "HIGH" or "LOW" status signals, as only an example, through additional circuitry.

Figure 5A:
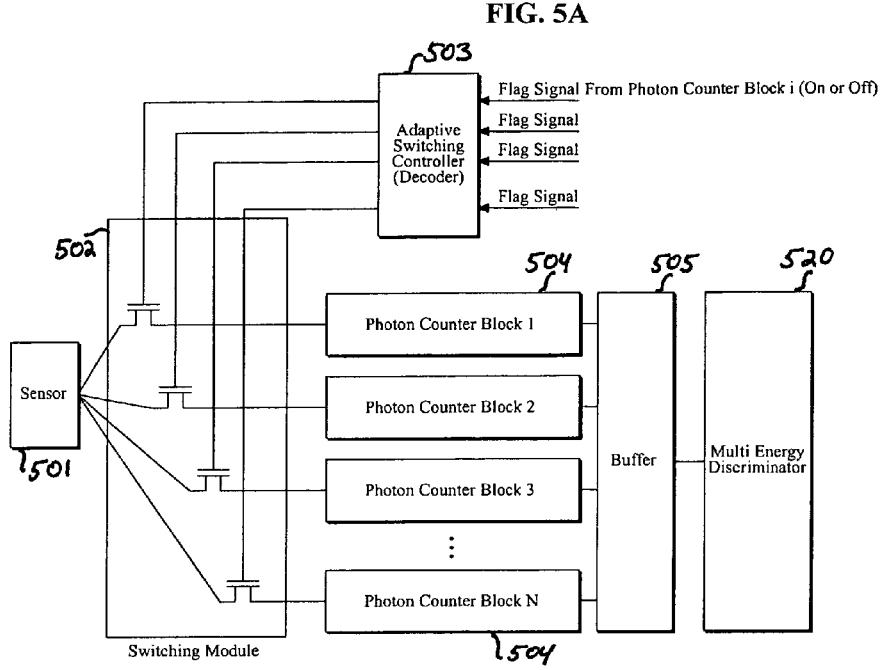
FIGS. 5A-5B illustrate photon detection and counting systems with a Multi Energy discriminator, according to one or more embodiments.
Figure 5B:
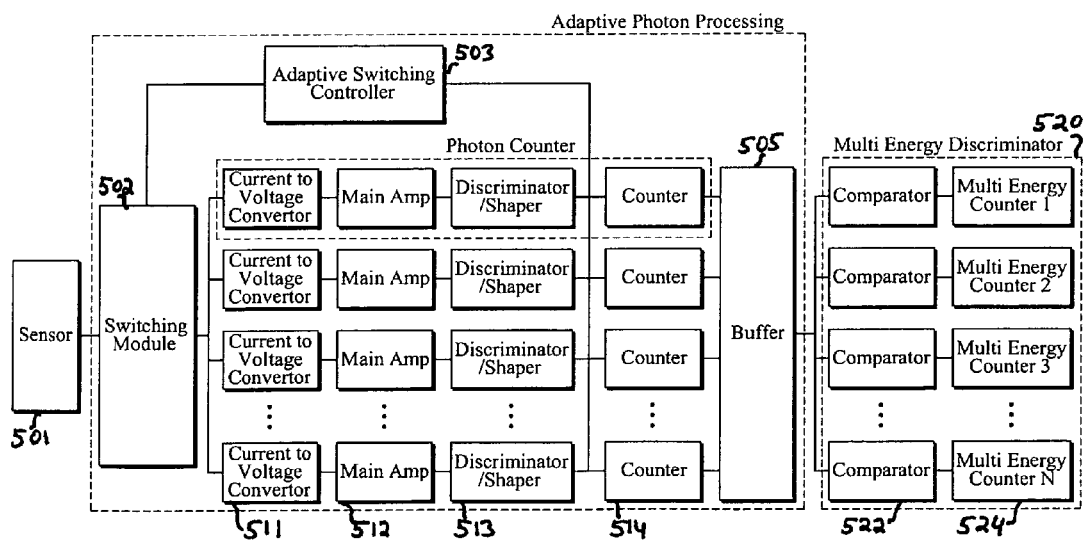

The buffer 105 may store the counting result of the counters 104-2, 104-3, and 104-4. An image processing unit may be provided at the end of the buffer 105, and included with the system of the buffer in one or more embodiments, to image the counting result. In addition, when used in a multi energy system, a Multi Energy Discriminator system may be included with the photon counting system of FIG. 1, and may analyze information of each reviewed counted pulse signal stored in the buffer 105. In one or more embodiments, the multi energy system may illustrate an acquired high energy image with high contrast, such as when X-rays are detected for a high contrast X-ray image. An embodiment with the Multi Energy Discriminator is shown in FIGS. 5A and 5B, and will be discussed in greater detail below.

Referencing back to FIG. 1, each of the counters 104-1, 104-2, 104-3, and 104-4 notifies the control unit 103 of its current state, e.g., dead time state, through the flag signal. The control unit 103 and the switching unit 102 allow the electric signals or charges from the sensor unit 101 to be selectively provided along an electrical path enabling a normal operation of the photon detecting and counting system 100 based on the flag signal, thereby removing the pulse pile-up phenomenon due to dead time.

Figure 3:
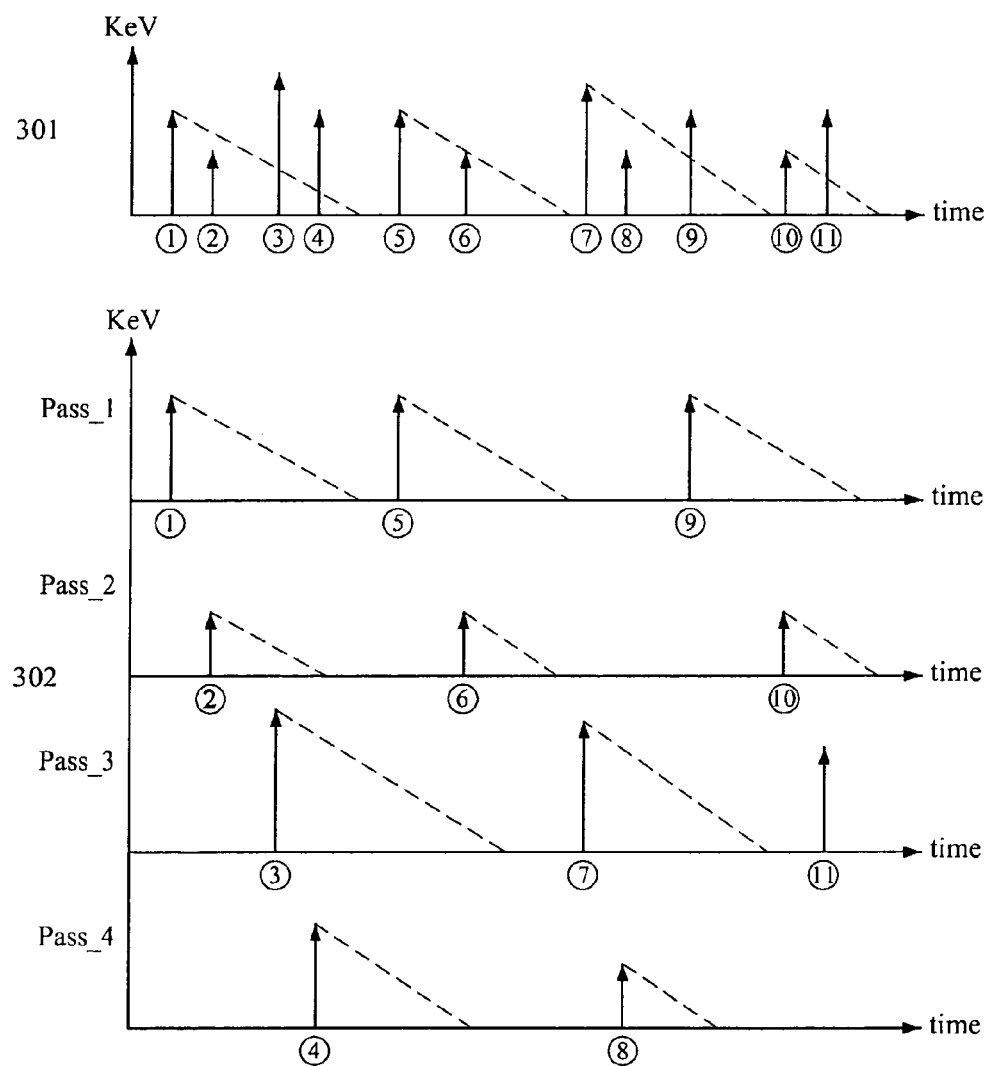
FIG. 3 illustrates input signals of a photon counting system, according to one or more embodiments.

FIG. 3 is a view illustrating input signals of a photon counting system, according to one or more embodiments.

Reference numeral 301 represents outputs of the sensor unit 101, and reference numeral 302 represents pulse signals input to the counters 104-1, 104-2, 104-3 and 104-4. For example, Pass_1 represents the input of the first counter 104-1, Pass_2 represents the input of the second counter 104-2, Pass_3 represents the input of the third counter 104-3, and Pass_4 represents the input of the fourth counter 104-4.

Arrows shown in FIG. 3 represent pulse voltages generated by detected photons, i.e., as provided by the sensor unit 101, and the time elapsed under the illustrated dashed lines extending down and right from the tip of each arrow represents dead time generated when photons are counted. As noted above, the dead time represents the time the corresponding counter should potentially not be available, to prevent pile up. This dead time may also include the time it takes for each electric signal or charge provided by the sensor unit 101 to sufficiently dissipate, i.e., so there is a desirably minimum charge influence between applied electric signals or charges. This can be seen in FIG. 6B, for example, where the energy level of the charge provided by the photomultiplier may also control the dead time, as the dissipation time for larger charges is greater than smaller charges. As the energy level of the charges provided by the photomultiplier may be variable, the dead times may not be predicted solely by estimating the processing time of the counting unit 104. Accordingly, reliance on the status of each of the discriminators 203 may be beneficial to more accurately count provided electric signals or charges provided by the sensing unit 101 without pile up, noting that alternative portions of the counters 104, or even buffer 105, could provide this status indication of whether the respective counter 104 is available for a next pulse signal without generating a pile up, or most probable to not generate a pile up if a new pulse signal were to be applied to the same counter 104.

First, a case in which a conventional photon counting system includes a single counter will be described.

Since only one counter is provided in the conventional photon counting system, all of the electric signal or charges 301 from the sensor unit 101 are input into the single counter. In order for the counter to process a pulse ①, dead time Td is generated. That is, even if the pulses ②, ③ and ④ are generated during the dead time Td, the photon counting system can not process the pulses ②, ③ and ④, or a pile up will occur However, since one or more embodiments of the photon detecting and counting system use a plurality of counters, the pile-up phenomenon due to dead time may be avoided.

The electric signals or charges 301 output by the sensor unit 101 may be distributed through the switching unit 102 similarly to the respective counter 104 inputs, as pulse signals 302, based on stand by statuses of each of the counters. For example, in the case that the first counter 104-1 processes the pulse ①, the first counter 104-1 counts the pulse ① and provides the control unit 103 with a flag signal indicating that the first counter 104-1 is in operation. The control unit 103 recognizes that the first counter 104-1 is in operation and the remaining counters 104-2, 104-3 and 104-4 are on standby based on the received respective flag signals. Sequentially, if the pulse ② is input into the switching unit 102, the control unit 103 transmits a control signal to the switching unit 102 such that one of the counters 104-2, 104-3 and 104-4, that is any counter except for the first counter 104-1, processes the pulse ②. For example, the pulse ② may be input into the second counter 104-2. Similarly, at this time the second counter 104-2 provides the control unit 103 with a flag signal indicating that the second counter 104-2 is in operation, and the control unit 103 controls the switching unit 102 based on the flag signal transmitted from the second counter 104-2.

That is, if one of the counters is in dead time, a signal transmission path is connected which transmits signals to another counter not in dead time. As a result, even if a photon is detected by sensor unit 101 during the dead time Td for one of the counters 104, the photon counting system can still count the respective photons without the pile-up phenomenon occurring.

Although the photon detecting and counting system has been described above such that the counters 204 are sequentially used, the use of the counters 104 are not limited thereto and any one of the counters 104 that is not in dead time may be selected at random for use. For example, if the photon counting system has a plurality of counters 104 not in dead time, a counter 104 that has not been in operation for the longest time may be selected for use, or if all counters 104 are in dead time then a counter 104 that has been in operation for the longest time may be selected for use or the newly available pulse signal from the sensor unit 101 may be restricted or eliminated, noting that alternative schedules for selecting counters are equally available. Additionally, though illustrated as being identical, the counters 104 are not required to be the same, and each may different characteristics or features. For example, the flags for the respective status of each of the counters may be provided from the discriminator 203 in one counter 104 and provided from another portion in another counter 104.

Figure 4:
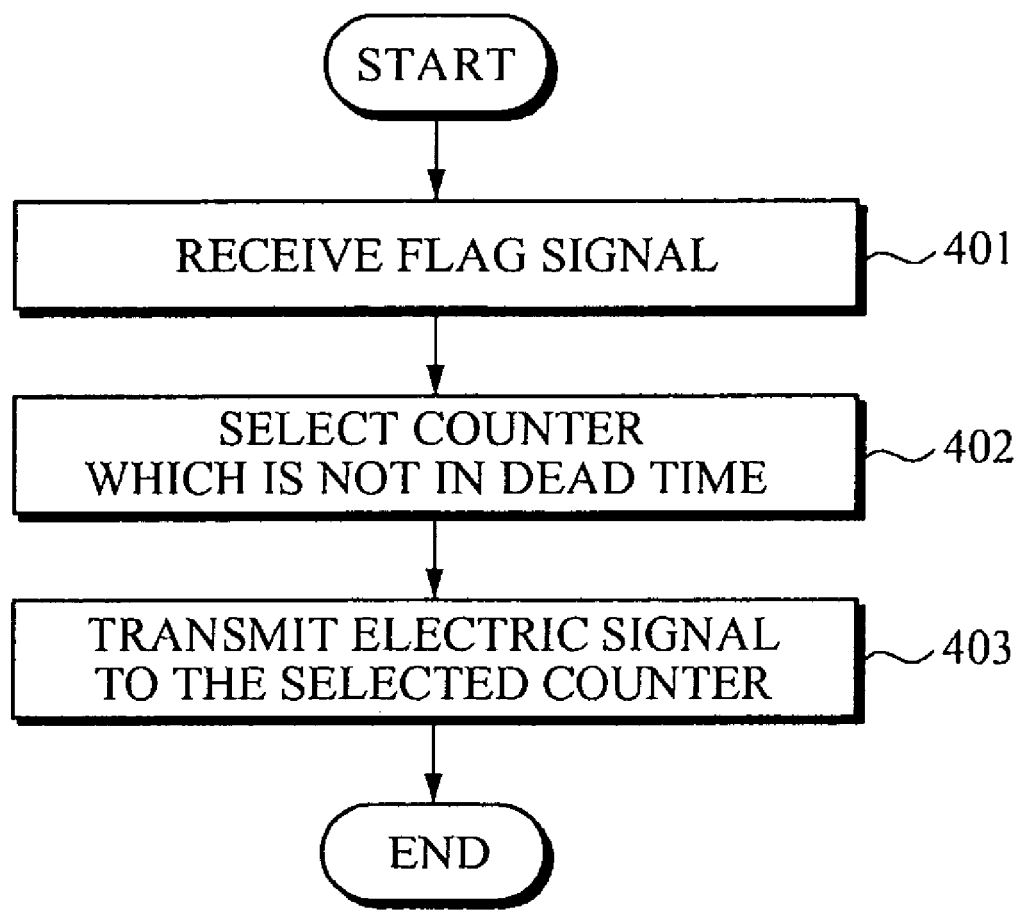
FIG. 4 is a flowchart illustrating a photon counting method, according to one or more embodiments.

FIG. 4 is a flowchart illustrating a photon counting method, according to one or more embodiments. A flow of the photon counting method will be described in conjunction with FIG. 1, though embodiments are not limited to the same system.

A controller may receive respective flags or indicators from one or more of counters that are capable of receiving an output electric signal or charge from a photon detector, in operation 401. For example, the control unit 103 may receive a flag signal from each of the counters 104-1, 104-2, 104-3 and 104-4. The flag signal may indicate the availability of each of the counters 104-1, 104-2, 104-3 and 104-4 for a counting of a photon. The availability for counting a photon may be based on several factors for each counter 104, including the factor of whether the counter 104 could count a photon without pile up, for example. In one or more embodiments, the flag signal is implemented using the digital comparative value of the discriminator 203 provided in each of the counters 104-1, 104-2, 104-3 and 104-4.

A select one, for example, of the counters may then be selected to be electrically connected with the photon detector or be provided an electric signal or charge derived from the photon detector, in operation 402. For example, the control unit 103 selects at least one of the counters, which is not in dead time, using the received flag signal. In an embodiment, if the respective digital comparative value for a counter corresponding to a detected photon is '1', the control unit 103 may designate a counter outputting a flag signal '0' as a counter not in dead time and may provide the electric signal or charge from the sensor unit to the counter not in dead time. In one or more embodiments, the provided electric signal or charge may be provided to more than one counter. Depending on the form of the pulse signal, e.g., as a voltage or current pulse signal, or the arrangement of the counter 104, in such a case the amplifiers 202 or discriminators 203 of the respective counters 104 may need to be variably controlled to accommodate the corresponding shared pulse signal. Additionally, in an embodiment where there are plural photon detectors within the sensor unit 101, producing plural electric signals or charges at respective anodes, the control unit 101 may further control which counter 104 should receive which electrical signal or charge.

The selected one or more counters selected for connection with the photon detector or provided the electric signal or charge derived from the photon detector may be electrically connected with the electric signal or charge, in operation 402. For example, the control unit 103 may control the switching unit 102 such that the electric signal or charge corresponding to one or more photons detected by the sensor unit 101 is provided to the selected counter which is not in dead time. For example, the switching unit 102 may switch a signal transmission path such that the electric signal or charge is transmitted to a counter, which is not in operation, according to a control signal of the control unit 103.

FIGS. 5A and 5B illustrate photon detection and counting systems, according to one or more embodiments. As shown in FIGS. 5A and 5B, a sensor 501 provides the electric signal or charge to one or more select photon counter blocks 504 through a switching module 502. As shown in FIG. 5A, the switching module 502 may include separate switches that selectively open or close to permit provision of the output of the sensor 501 to the respective photon counter block 504. FIG. 5B collectively illustrates the plural photon blocks 504 as an adaptive processing system. FIG. 5B further illustrates each photon counter block 504 as having a voltage to current converter 511, a main amplifier 512, a discriminator/shaper 513, and a counter 514, with the status flags being derived from the same output signal of the discriminator/shaper 513 that is provided to each counter 514. The flag signals are provided to the Adaptive Switching Controller 503, which controls the provision of the output of the sensor 501 to select photon counter blocks 504 through the switching module 502. Here, the flags may be output to the Adaptive Switching Controller 503 from the discriminator/shaper 513 as the constant "HIGH" or "LOW" voltages, for example, before the discriminator/shaper 513 generates the shaped pulse that is output to counter 514. In one or more embodiments, the "HIGH" or "LOW" signal from the discriminator/shaper 513 may be directly applied to the switching module 502. Collectively, the switching module 502, Adaptive Switching Controller 503, photon counter block 504, and buffer 505 may be referred to as an Adaptive Photon Processing system. The systems of FIGS. 5A and 5B further illustrate a Multi Energy Discriminator system 520, with additional comparators 522 and multi energy counters 524 that represent a processed pulse charge analysis and classification. The processed pulse charge signals, as an output of the buffer 505, may be classified according to their amplitudes by the multi comparators, and then the classified signal's counts may be visualized as gray level images on an included display.

Similar to the above photon counting system of FIG. 1, an output of the discriminator/shaper 513 may be a constant TTL logic level or CMOS level, for example, though alternative output levels are available, for indicating the status of each photon counter block 504 and a shaped rectangular pulse, for example, adequate for the subsequent counter 514 to count the detected photon. The discriminator/shaper 513 or other reviewing stages of the photon counter block 504, for example, may provide the buffer 505 with additional information regarding each pulse signal that has be discerned to be a photon count, such as pulse amplitude, pulse width, dissipation time, frequency, etc., as only examples. In addition, when used in a multi energy system, one or more embodiments an image processing unit may be included with the system of a Multi Energy Discriminator analyzing information of each reviewed counted pulse signal stored in the buffer 505, such as photon count information provided by the photon counter blocks. Based upon analysis by the multi energy discrimination, the multi energy system may illustrate an acquired high energy image with high contrast on an include display or store corresponding image data in a memory, such as when X-rays are acquired for a high contrast X-ray image.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A photon counting system, the system comprising:
a counting unit including a plurality of counters configured to respectively count photons detected by a sensor unit;
a switching unit to selectively electrically provide an electric signal from the sensor unit, representing a potential detection of a photon by the sensor unit, to at least one of the counters; and
a control unit to control the switching unit to selectively electrically provide the electrical signal to the at least one counter based on one or more received flag signals indicating whether one or more of the plurality of counters are in respective dead times that could result in respective pile ups of plural charges for plural photon detections at the respective one or more plurality of counters that are in dead time, with the control unit selectively providing the electric signal to the at least one counter that is not in the dead time.

2. The system of claim 1, further comprising the sensor unit, wherein the sensor unit includes at least a photomultiplier.

3. The system of claim 1, further comprising the sensor unit, wherein the sensor unit includes at least one of a photo diode and a CCD.

4. The system of claim 1, wherein each of the counters comprises:
a discriminator to compare a voltage or current derived from the electric signal with a reference voltage or reference current to discriminate whether the electric signal from the sensor unit represents a photon detection; and
a counter to count a photon detection based upon an output of the discriminator.

5. The system of claim 4, wherein at least one flag signal, of the one or more flag signals, is defined based on a discrimination performed by a discriminator of at least one of the plurality of counters.

6. The system of claim 5, wherein the at least one flag signal is defined based on a "HIGH" or "LOW" signal output by the discriminator, to a corresponding counter, verifying whether the sensor unit detected a photon.

7. The system of claim 1, further comprising a buffer memory to store photon count information from the plurality of counters.

8. The system of claim 7, further comprising a multi energy discriminator including plural counters and multi energy counters analyzing the photon count information stored in the buffer.

9. The system of claim 7, wherein the photon count information includes count information of X-ray photons detected by the sensor unit and counted by the counting unit.

10. The system of claim 1, wherein the plurality of counters are each configured to count X-ray photons detected by the sensor unit.

11. The system of claim 1, wherein the switching unit prevents the electric signal from being electrically provided to any one of the counters that is in operation based on at least one control signal provided to the switching unit from the control unit corresponding to a flag, of the one or more flags, indicating that the one counter is in operation.

12. A photon counting system, the system comprising:
a counting unit including a plurality of counters configured to respectively count photons detected by a sensor unit;
a switching unit to selectively electrically provide an electric signal from the sensor unit, representing a potential detection of a photon by the sensor unit, to at least one of the counters; and
wherein the switching unit selectively electrically provides the electrical signal to the at least one counter based on one or more status indicators from the counting unit indicating whether one or more of the plurality of counters are in respective dead times that could result in respective pile ups of plural charges for plural photon detections at the respective one or more plurality of counters that are in dead time, with the switching unit selectively providing the electric signal to the at least one counter that is not in the dead time.

13. The system of claim 12, wherein the one or more status indicators include a status indicator from each of the plurality of counters indicating a current operating status of a respective counter.

14. The system of claim 13, further comprising a control unit to receive each of the status indictors from the plurality of counters and to control the switching unit to selectively provide the electric signal to the at least one counter that is not in dead time based upon the received status indicators.

15. The system of claim 14, wherein, when each of the status indicators indicates that the respective counters are all not in dead time, the control unit controls the switching unit to provide the electric signal to a counter determined to have been in a non-dead time the longest.

16. The system of claim 12, wherein each of the counters comprises:
a discriminator to discriminate whether the electric signal from the sensor unit represents a photon detection; and
a counter to count a photon detection based upon an output of the discriminator.

17. The system of claim 16, wherein the one or more status indicators include a status indicator from each counter based upon the corresponding discriminator discrimination.

18. The system of claim 12, wherein the switching unit includes a switch for each of the plurality of counters to respectively control provision of the electric signal to each of the plurality of counters.

19. A photon counting method, the method comprising:
selecting at least one of a plurality of counters, configured to respectively count photons detected by a sensor unit, that is not in a dead time based on at least one status indicator indicating a counting availability the counters; and
selectively providing an electric signal from the sensor unit, representing a potential detection of a photon by the sensor unit, to the selected at least one counter,
wherein the selecting of the at least one counter is based on the at least one status indicator indicating whether one or more of the plurality of counters are in respective dead times that could result in respective pile ups of plural charges for plural photon detections at the respective one or more plurality of counters that are in dead time, with the selective provision of the electric signal including selectively providing the electric signal to the selected at least one counter that is not in the dead time.

20. The method of claim 19, wherein each of the counters compare a voltage or current derived from the electric signal with a reference voltage or reference current to discriminate whether the electric signal from the sensor unit represents a photon detection, and counts a photon detection based upon the discrimination.

21. The method of claim 20, wherein the at least one status indicator includes plural flag signals each defined based on the respective discriminations by each of the counters.

22. The method of claim 19, further comprising storing photon count information by the plurality of counters in a buffer memory.

23. The method of claim 22, further comprising analyzing the photon count information stored in the buffer through plural multi energy discriminations and corresponding counters.

24. The method of claim 22, wherein the photon count information includes count information of X-ray photons detected by the sensor unit and counted by the plurality of counters.

25. The method of claim 19, wherein the plurality of counters are configured to count X-ray photons detected by the sensor unit.

26. The method of claim 19, wherein the selective provision of the electric signal includes preventing the electric signal from being electrically provided to any one of the counters that is in operation based on at least one control signal from a controller to a switching unit providing the selective provision of the electric signal, with the controller controlling the switching unit to prevent the provision of electric current based upon the at least one status indicator provided by at least one of the plurality of counters to the controller.

27. The method of claim 26, wherein, the at least one status indicator includes plural status indicators each for a respective counter, and when the status indicators indicate that all counters are not in dead time, the controller controls the switching unit to provide the electric signal to a counter determined to have been in a non-dead time the longest.

28. The method of claim 19, wherein the at least one status indicator includes plural status indicators each for a respective counter indicating a current operating status of the respective counter.

29. At least one non-transitory recording medium comprising computer readable code to control at least one processing device to implement the method of claim 19.

* * * * *